Patented July 26, 1938

2,125,087

UNITED STATES PATENT OFFICE 2,125,087

AZO DYESTUFF PREPARATIONS

Albert Schmelzer, Cologne, Germany, assignor to General Aniline Works, Inc., New York, N. Y., a corporation of Delaware No Drawing. Application July 20, 1937, Serial No. 154,632. In Germany July 25, 1936

10 Claims. (Cl. 8—45)

The present invention relates to azo dyestuff printing preparations and to a process of printing therewith.

It is known that water insoluble azo dyestuffs can be prepared from alkaline solutions comprising coupling components and such diazoamino compounds as contain at least one solubilizing group in the radical attached to the amino-nitrogen, the azo dyestuffs being developed by a reduction in the alkalinity of the preparation. This process is employed primarily for the manufacture of azo dyestuffs on the fiber, the dyestuffs being developed in this case by treating the printed fiber with acid vapours at an elevated temperature.

This subsequent acid treatment entails certain disadvantages chief among which is the corroding effect of the acid vapours on the hot steaming apparatus. Furthermore, this acid treatment makes it impossible to develop such azo dyestuffs in combination with vat dyestuffs. Therefore, it previously has been suggested to modify these preparations in such a manner that a sufficient reduction of alkalinity is reached by a mere heat treatment, for instance, by steaming without the necessity of working in the presence of acid vapours. However, no clear success has been reached up to the present time, since all these modified preparations have proved to be relatively unstable even at ordinary temperature, thus preventing the practical use of such preparations.

It is the object of my present invention to do away with these disadvantages and to develop a process according to which azo dyestuffs can be prepared from coupling components and diazo compounds of the character described either in substance or on the fiber by a simple heat treatment in the presence of moisture, particularly by a mere steaming, without being accompanied by the disadvantages inherent to the prior known processes. Another object of my invention resides in the preparation of compositions comprising coupling components and such diazoamino compounds, said compositions being capable of developing the azo dyestuff by a simple heat treatment in the presence of moisture and of being stored for indefinite periods of time.

With these and other objects in view the characteristic feature of my invention consists in the combination of the following steps:

(a) The diazoamino compounds of the character described are employed at least partly in the form of salts with volatile bases.

(b) In the mixture of diazoamino compounds and coupling components, serving for the preparation of the dyestuffs, non-volatile alkalies are either entirely absent or present in such a small amount only that after the removal of the volatile bases part of the acid groups contained in said diazoamino compounds and in said coupling components remains free.

(c) Said volatile bases are eliminated from said mixtures by blowing in vapour whereby the acid groups set free by such elimination decompose said diazoamino compounds with the formation of the corresponding diazo compounds and coupling of the diazo compounds and the coupling components takes place.

In case the azo dyestuffs are to be prepared on the fiber step (c) is preferably effected by steaming. For the purpose of my present invention such diazoamino compounds are preferred as are relatively easily split up by a reduction in the alkalinity of the preparation it being understood, however, that the use of an additional acid reacting vapour during steaming is not beyond the scope of my invention, since also in this case part of the dyestuffs is developed by the acid groups of the diazoamino compounds set free by the elimination of the volatile bases. The expression "volatile bases" is intended to comprise those volatile per se, e. g. ammonia and also those which are volatile with steam, e. g. pyridine or lower mono-, di- and tri-alkyl amines such as dimethylamine, diethylamine, propylamines and butylamines. Such bases are preferred as have a boiling point between about 30° C. and about 80° C. The upper limit for the permissible quantity of non-volatile alkalies depends on the amount of the acid salt-forming groups contained in the reaction components. Thus, for example, the use of aniline-2.4-disulfonic acid or of aniline-2-carboxylic-4-sulfonic acid as stabilizer permits of the employment of a higher amount of non-volatile alkalies than the use of taurine or sarcosine. However, the amount of non-volatile alkalies employed must be in all events and is preferably substantially less than that required to neutralize the acid groups set free by the elimination of the volatile bases during the steaming operation. Non-volatile alkalies may, if desired, be dispensed with altogether in the preparations. Thus, in the products to be put on the market the presence of non-volatile alkalies is preferably avoided entirely as the presence of such alkalies would involve the danger of decomposing the preparations particularly at higher temperatures. On the other hand, a certain amount of non-volatile alkalies (within the allowed limits) is preferably added to the preparations before practical use as an increase of the affinity of the coupling components for the fiber is effected thereby.

The term "diazo compounds" is intended to include diazo compounds of azo dyestuffs, e. g. of the amino-azo compounds, and the same applies to the diazoamino compounds which are derived therefrom. As coupling components there are preferably employed the well-known 2.3-hydroxycarboxylic acid arylamides of the naphthalene or of other higher ring systems the derivatives thereof and beta-ketocarboxylic acid arylamides.

Among the salts of volatile bases with diazoamino compounds of the character described ammonium salts are preferred in carrying out my present invention. These can be produced by converting the amino sulfonic or carboxylic acid serving as stabilizer for the diazo compound into its ammonium salt by treating it with ammonium carbonate and then causing this product to react with the diazo compound. The coupling component may be brought into a dissolved or dispersed state by first stirring it in the presence of water with a dispersing and/or a hydrotropically acting agent and then adding a volatile base, it being uncertain whether in every case a salt formation between the volatile base and the coupling component takes place or not.

The dyeing and printing preparations of the present invention contain coupling components and volatile base salts of diazoamino compounds having acid salt-forming groups in the residue attached to the amino-nitrogen. These preparations are employed in the form of pastes or powders. In the latter case the usual addition products such as thickening agents and so on are added thereto before printing. In any case the addition of non-volatile alkalies (within the allowed limits) may be of advantage before printing.

The present invention allows one to develop azo dyestuffs from such coupling components and such diazoamino compounds simultaneously with vat dyestuffs from their leuco compounds. This is to be regarded as a further feature of my invention.

The following examples illustrate the invention without, however, restricting it thereto the parts being by weight:—

A

MANUFACTURE OF THE SALTS OF DIAZOAMINO COMPOUNDS WITH VOLATILE BASES

*Example 1*

42.5 parts of 4-chloro-2-toluidine are suspended in 250 parts of water and 115 parts of hydrochloric acid and diazotized at a temperature of 10–12° C. with a solution of 20.5 parts of sodium nitrite in 50 parts of water. The diazo solution is filtered and at 0 to +5° C. quickly added to a solution of 80 parts of 4-sulfo-2-aminobenzoic acid in 700 parts of pyridine, which is diluted with 300 parts of water, while thoroughly stirring the mixture. After 4–5 hours' stirring no diazo compound can be traced. Then the mixture is diluted with about 1000 parts of water and salted out with about 500 parts of ammonium chloride. The pyridine salt of the diazo amino compound precipitates in yellow crystals. The product filtered with suction is dried in the open air. This diazoamino compound has probably the following formula:

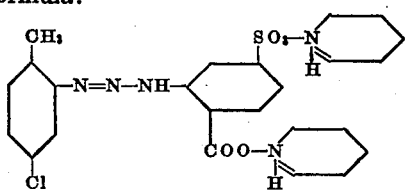

If instead of pyridine, quinoline or quinaldine is used, corresponding salts of the diazoamino compounds are obtained.

*Example 2*

42.5 parts of 4-chloro-2-toluidine are diazotized as described in Example 1. At a temperature of about −4° C. the filtered diazo solution is added quickly to a solution prepared from 80 parts of 4-sulfo-2-amino-benzoic acid, 140 parts of ammonium carbonate and 800 parts of water while stirring thoroughly. Coupling occurs with the evolution of carbon dioxide. A diazoamino compound probably of the following formula precipitates in yellow crystals:

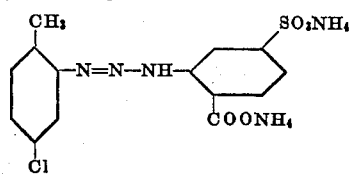

After an about 3–4 hours' stirring no more diazo compound is detectable. The mixture is filtered with suction and thoroughly dried.

*Example 3*

If 76 parts of 5-sulfo-3-aminobenzoic acid are used instead of the 4-sulfo-2-aminobenzoic acid a diazoamino compound probably of the following formula is obtained:

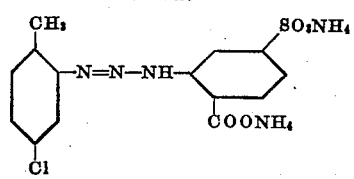

As it does not precipitate from the solution, it is isolated by salting out with about 350 parts of sodium chloride; it shows a yellow coloration.

*Example 4*

When using 115 parts of isobutyl-5-sulfo-2-amino-benzoic acid under the conditions mentioned in Example 2, a diazoamino compound probably of the following formula is obtained:

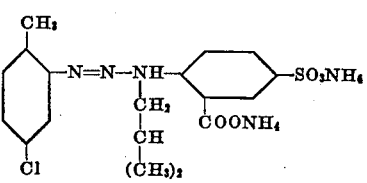

The product crystallizes in yellow crystals. It is worked up as described in Example 2.

*Example 5*

42.5 parts of 4-chloro-2-toluidine are diazotized according to the instructions given in Example 2; the solution is then made slightly acid to Congo red by addition of a solution of 25 parts of ammonium carbonate in 100 parts of water. The filtered diazo-solution is quickly added to a solution containing 58.5 parts of 2-aminoterephthalic acid and 115 parts of ammonium carbonate in 800 parts of water below 0° C. while thoroughly stirring. The diazoamino compound probably of the following formula precipitates in yellow crystals:

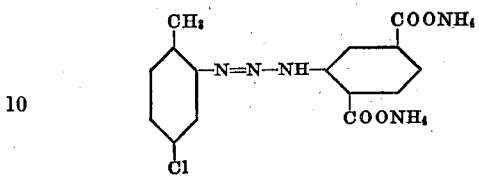

The working up is performed as described above. If the aminoterephthalic acid of the above example is substituted by the aniline-2.5-disulfonic acid, the corresponding diazoamino compound also precipitating from the reaction mixture in yellow crystals is obtained.

*Example 6*

48.6 parts of 2.5-dichloraniline are suspended in a solution of 130 parts of hydrochloric acid in 230 parts of water and diazotized at a temperature of 10–15° C. with 20.5 parts of sodium nitrite, dissolved in 50 parts of water while stirring thoroughly. The diazo solution is neutralized and filtered if necessary; about 25 parts of ammonium carbonate dissolved in 100 parts of water are added thereto. While stirring thoroughly at about —4° C. to 0° C. this solution is added drop by drop to a solution of 80 parts of 4-sulfo-2-aminobenzoic acid in 800 parts of water having admixed therewith 115 parts of ammonium carbonate.

A yellow colored diazoamino compound probably of the following formula:

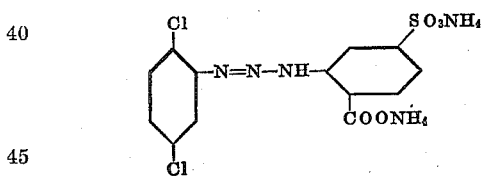

precipitates. As it is rather difficulty soluble in water, it is washed and dried thoroughly after having been filtered with suction.

*Example 7*

48.6 parts of 2.5-dichloraniline are diazotized as described in Example 6 and added drop by drop at 0 to +10° C. to a solution of 80 parts of 4-sulfo-2-aminobenzoic acid in 840 parts of a sodium carbonate solution of 16.5% strength while stirring thoroughly. When diazo compound can no longer be traced, it is salted out with about 200 parts of ammonium chloride, stirring being continued for 2 hours, and then filtered with suction. The diazoamino compound thus isolated is present at least in part in the form of its ammonium salt.

*Example 8*

According to the directions given in Example 6 2.5-dichloraniline is diazotized whereupon the diazo solution is neutralized. The 4-sulfo-2-aminobenzoic acid is replaced under the same conditions by 72 parts of 5-sulfo-2-amino-benzoic acid. In this case the diazoamino compound is salted out by means of 350 parts of sodium chloride and carefully dried after having been rinsed with a 75% sodium chloride solution.

*Example 9*

46.4 parts of 5-nitro-2-toluidine are added to a solution consisting of 115 parts of hydrochloric acid and 150 parts of water. The amine is then diazotized at 10–12° C. by stirring with 20.5 parts of an aqueous sodium nitrite solution. After neutralizing by means of 125 parts of a 20% ammonium carbonate solution the reaction product is filtered, whereupon the diazo solution is caused to react with a solution of 80 parts of the ammonium salt of 4-sulfo-2-aminobenzoic acid as set forth in Example 6. The diazoamino compound which probably corresponds to the following formula:

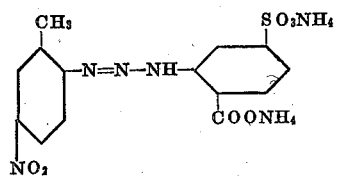

is salted out by means of 300 parts of ammonium chloride; it forms deeply yellow crystals which are filtered with suction and carefully dried.

*Example 10*

On replacing the 4-sulfo-2-aminobenzoic acid by 5-sulfo-2-aminobenzoic acid there is obtained according to the directions given in Example 9 a diazoamino compound probably of the following formula:

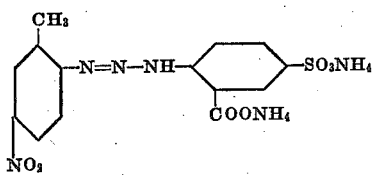

which may also be salted out from the reaction mixture.

*Example 11*

According to the directions given in Example 5 42.5 parts of 4-chloro-2-toluidine are diazotized. After neutralizing, the diazo solution thus obtained is added while thoroughly stirring below 0° C. to a solution of 75 parts of ammonium carbonate and the diethylamino salt of 4-sulfo-2-amino-benzoic acid (obtained from 80 parts of 4-sulfo-2-aminobenzoic acid and 48 parts of 98.5% diethylamine in 800 parts of water). The diazoamino compound which probably corresponds to the following formula:

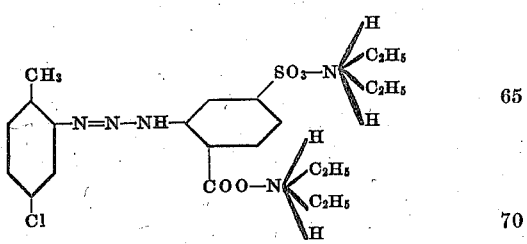

is filtered with suction, rinsed with a 75% saturated sodium chloride solution and carefully dried.

Example 12

On replacing the diethylamine employed in Example 10 by 69 parts of a 95% triethylamine a diazoamino compound probably of the following formula is obtained:

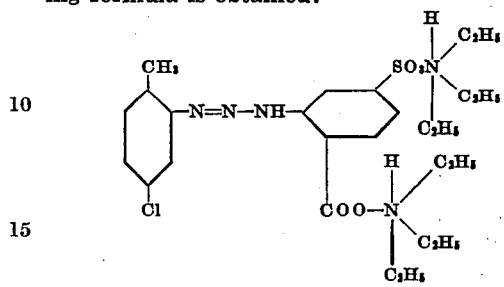

The product separating out is worked up as described in Example 10.

Example 13

111.1 parts of an 80% paste of 2-amino-5-benzoylamino-hydroquinonediethylether are finely suspended in 90 parts of water and 140 parts of raw hydrochloric acid and then diazotized at a temperature of 15–20° C. by means of a solution of 26 parts of sodium nitrite in 65 parts of water. The solution is filtered and at 15° C. added while stirring to a solution of 41.1 parts of sarcosine chlorohydrate and 164 parts of ammonium carbonate in 500 parts of water. When no diazo compound can be traced anymore, the precipitated diazoamino compound which probably has the following constitution:

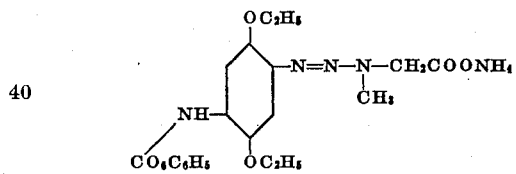

is sucked off and dried. It represents a weakly yellowish powder.

Example 14

59.4 parts of 4-chloro-2-anisidine chlorohydrate are diazotized as described in Example 1. The filtered solution is added into a solution of 80 parts of 4-sulfo-2-amino-benzoic acid and 140 parts of ammonium carbonate in 500 parts of water, below 0° C. and while stirring. The diazoamino compound which probably has the following constitution:

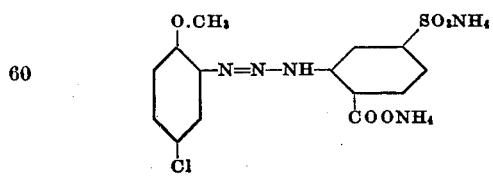

precipitates; it is isolated in the usual manner.

Example 15

The diazo compound of Example 13 is added while stirring at a temperature of 15° C. to a solution of 80 parts of 4-sulfo-2-aminobenzoic acid and 130 parts of ammonium carbonate in 500 parts of water. The reaction being finished the precipitating yellowish ammonium salt of the diazoamino compound is sucked off and dried.

Example 16

When using a mixture of 65.7 parts of 4-toluidine-2-sulfonic acid under the conditions described in Example 2, a diazoamino compound of the following probable constitution is obtained:

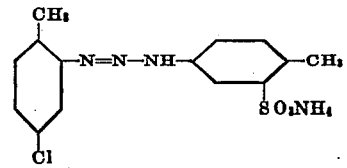

The product precipitates in weakly yellowish crystals.

Example 17

When using a mixture of 44.5 parts of methyltaurine under the conditions of Example 13 the ammonium salt of the diazoamino compound of methyltaurine and 2-amino-5-benzoyl-aminohydroquinone diethylether is obtained in form of a greenish-grey powder.

Example 18

When using 53 parts of methylamino succinic acid under the conditions of Example 13 the diazoamino compound of the following probable formula is obtained:

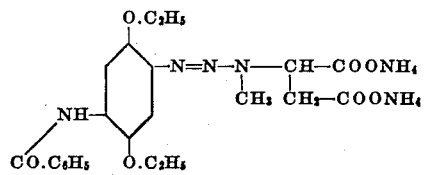

The product shows a yellow coloration.

Example 19

136.2 parts of a 60% paste of 2-amino-5-benzoylamino-hydroquinonedimethylether are diazotized and caused to react with 43.5 parts of iminodiacetic acid dissolved in water under the conditions described in Example 13; the following diazoamino compound is obtained:

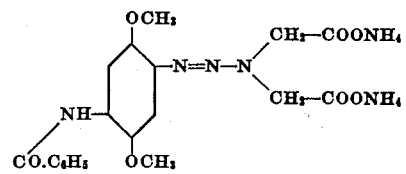

The product represents a yellow powder.

Example 20

95 parts of an 80% paste of 2-amino-5-benzoylamino-4-methyl-1-anisole are caused to react with sarcosine chlorohydrate and ammonium carbonate under the conditions described in Example 13. The following diazoamino compound is obtained:

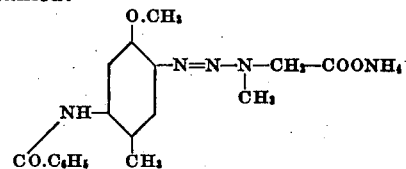

Example 21

When using 78.4 parts of beta-methylamidotetrahydro naphthalene monosulfonic acid under the conditions of Example 13 the following diazoamino compound is obtained:

[Chemical structure diagram showing a diazoamino compound with O.C₂H₅, NH, CO.C₆H₅, O.C₂H₅, CH₃, H, N=N-N, H₂C, C, H₂, SO₃NH₄ groups]

This product shows a brown coloration.

Example 22

When using 69.4 parts of tetrahydroquinoline monosulfonic acid under the conditions of Example 13, the following diazoamino compound is obtained:

[Chemical structure diagram showing a diazoamino compound with O.C₂H₅, NH, CO.C₆H₅, O.C₂H₅, N=N-N, CH₂-CH₂, CH₂, SO₃NH₄ groups]

This compound precipitates in form of an orange colored powder.

Example 23

37.2 parts of pyrolidine-alpha-carboxylic acid are used for the preparation of the diazoamino compound under the conditions of Example 13. The following product is obtained:

[Chemical structure diagram showing a diazoamino compound with O.C₂H₅, NH, CO, C₆H₅, O.C₂H₅, N=N-N, CH₂-CH₂, CH-CH₂, COONH₄ groups]

This diazoamino compound precipitates in weakly greyish-colored crystals.

B

MANUFACTURE OF PRINTING SOLUTIONS BY DISSOLVING OR DISPERSING THE COUPLING COMPONENTS AND THE DIAZOAMINO COMPOUNDS WITH THE AID OF VOLATILE BASES.

Example 1

2.8 parts of 2.3-hydroxynaphthoyl-1'-amino-2'-methylbenzene and 5 parts of the ammonium salt of the diazoamino compound obtained from diazotized 4-chloro-ortho-toluidine and 4-sulfo-2-aminobenzoic acid as described in Example A(2) are dissolved in 20 parts of a 75% diethylamine solution while thoroughly stirring. After the addition of the necessary thickening agents this solution is ready for the printing of textiles.

Example 2

The directions given in Example B(1) can be changed in such a manner that besides the 20 parts of a 75% diethylamine solution there are employed for effecting dissolution 0.4 to 0.8 part of caustic soda.

Example 3

1.3 parts of 2.3-hydroxynaphthoyl-1'-aminobenzene and 2.6 parts of the ammonium salt of the diazoamido compound from diazotized 2-amino-5-benzoylamino-hydroquinonediethylether and sarcosine prepared as described in Example A(13) are dissolved in 5 parts of benzylalcohol, 10 parts of water and 8 parts of diethylamine. It is preferred to add to this solution 5 parts of urea.

Example 4

1.6 parts of the methylol compound of the sodium salt of 2.3-hydroxynaphthoyl-1'-aminobenzene and 2.6 parts of the ammonium salt of the diazoamino compound from diazotized 2-amino-5-benzoylaminohydroquinonediethylether and sarcosine prepared as described in Example A(13) are dissolved in 5 parts of thiodiglycol, 10 parts of water and 5 parts of isopropylamine. It is preferred to add 5 parts of urea.

Example 5

3.1 parts of 2.3-hydroxynaphthoyl-1'-amino-2'-ethoxybenzene and 5 parts of the same diazoamino compound as employed in Example B(1) are dissolved in 3 parts of thiodiglycol, 12 parts of water and 10 parts of propylamine.

Example 6

1.4 parts of 2.3-hydroxynaphthoyl-1'-amino-2'-methylbenzene and 3.1 parts of the ammonium salt of the diazoamino compound from diazotized 2-amino-5-benzoylaminohydroquinone diethylether and methylaminoethane sulfonic acid are dissolved in the same way as described in Example B(3).

Example 7

1.9 parts of 3.3'-dimethyl-diacetoacetyl-4'4-diaminodiphenyl and 5 parts of the diazoamino compound described in Example B(1) are dissolved in 3 parts of thiodiglycol, 10 parts of water and 10 parts of butylamine.

Example 8

3.1 parts of 2.3-hydroxynaphthoyl-1'-amino-2'-ethoxybenzene and 6.5 parts of the diethylamine salt of the diazoamino compound from 5-sulfo-2-aminobenzoic acid and diazotized 2.5-dichloroaniline are dissolved in 5 parts of thiodiglycol, 10 parts of water and 8 parts of diethylamine.

Example 9

1.3 parts of 2.3-hydroxynaphthoyl-1'-aminobenzene and 3.5 parts of the ammonium salt of the diazoamino compound from iminodiacetic acid and diazotized 2-amino-5-benzoylaminohydroquinone dimethylether are dissolved in the same way as described in Example B(3).

Example 10

1.3 parts of 2.3-hydroxynaphthoyl-1'-aminobenzene and 3.7 parts of the ammonium salt of the diazoamino compound from diazotized 2-amino-5-benzoylaminohydroquinone diethyl ether and methylamino succinic acid prepared as described in Example A(18) are dissolved in the same way as described in Example B(3).

Example 11

1.3 parts of 2.3-hydroxynaphthoyl-1'-aminobenzene and 2.2 parts of the triethylamine salt of the diazoamino compound from diazotized 2-amino-5-benzoylamino-4-methyl-anisole and sarcosine are dissolved in 5 parts of thiodiglycol, 10 parts of water and 7 parts of diethylamine.

Example 12

1.4 parts of 2.3-hydroxynaphthoyl-1'-amido-2'-methylbenzene and 2.8 parts of the ammonium salt of the diazoamino compound from diazotized 2-amino-5-benzoylamino-hydroquinone-diethylether and pyrolidine-alpha-carboxylic acid prepared as described in Example A(23) are dissolved as described in Example B(3).

C

MANUFACTURE OF DRY PRINTING PREPARATIONS BY MIXING THE DRY COUPLING COMPONENT WITH THE DIAZOAMINO COMPOUND.

Example 1

Stable dry mixtures are obtained by thoroughly mixing 2.8 parts of 2.3-hydroxynaphthoyl-1'-amino-2'-methylbenzene and 5 parts of the dry ammonium salt of the diazoamino compound obtained from diazotized 4-chloro-ortho-toluidine and 4-sulfo-2-aminobenzoic acid.

Example 2

3.1 parts of 2.3-hydroxynaphthoyl-1'-amino-2'-ethoxybenzene are thoroughly mixed with 6.5 parts of the dry diethylamine salt of the diazoamino compound obtained from 5-sulfo-2-aminobenzoic acid and diazotized 2.5-dichloraniline.

D

MANUFACTURE OF AZO DYESTUFFS FROM THE PREPARATIONS OBTAINED ACCORDING TO B AND C

Example 1

The solutions obtained according to Example B(1) and (2) are printed on the fiber after the addition of a neutral thickening agent and developed after drying the fiber in the Mather Platt. A deep red shade is thus obtained.

Example 2

The dry preparations obtained according to Example C(1) and (2) and 0.2–0.8 part of an aqueous caustic soda solution are dissolved in about 20 parts of a 75% diethylamine solution and then printed and developed as described in Example D(1). In the case of Example C(1) a deep red shade is obtained, in the case of Example C(2) a clear orange shade.

Example 3

The solutions prepared as described in Examples B(3), (4), (6), (10) and (12) are employed for the printing of textiles after the addition of a neutral thickening agent as described in Example D(1). A greenish blue is obtained.

Example 4

The solution prepared as described in Example B(5), if made up into a printing paste, yields on cotton a clear scarlet.

Example 5

The solution obtained as described in Example B(7) yields a clear yellow.

Example 6

The solution obtained as described in Example B(8) yields an orange.

Example 7

The solution obtained as described in Example B(9) yields a reddish blue.

Example 8

The solution obtained as described in Example B(11) yields a violet.

Example 9

Two printing pastes of the following composition are produced:

(a) A mixture consisting of
28 parts of 2.3-hydroxynaphthoyl-1'-amino-2'-methyl-benzene,
50 parts of the ammonium salt of the diazoamino compound obtained from diazotized 4-chloro-2-toluidine and 4-sulfo-2-aminobenzoic acid according to Example A(2).
200 parts of 75% diethylamine solution,
220 parts of water and
500 parts of a neutral starch tragacanth thickening paste.

(b) 100 parts of Bz2-Bz2'-dimethoxy-dibenzanthrone (in the form of a 20% paste),
500 parts of a neutral starch tragacanth thickening paste,
80 parts of glycerine,
120 parts of potassium carbonate,
100 parts of Rongalite and
100 parts of water.

These two printing pastes are printed on the fiber and developed in the Mather Platt, a green and red print being thus obtained.

For convenience I am giving all further examples in form of a table it being to be understood that all preparations described therein are prepared and developed in a quite similar manner:—

| Base | Stabilizer | Coupling component | Volatile base | Shade |
| --- | --- | --- | --- | --- |
| 4-chloro-2-toluidine | 5-sulfo-2-amino-benzoic acid | 2.3 - hydroxynaphthoyl - 1'-amido-2'-methyl-benzene. | Diethylamine | Red. |
| 5-chloro-2-toluidine | 4-sulfo-2-amino-benzoic acid | 2.3 - hydroxynaphthoyl - 1'-amido-4'-methoxy-2'-methyl-benzene. | do | Do. |
| 4-chloro-2-toluidine | Piperidine-α-carboxylic acid | 2.3 - hydroxynaphthoyl - 1'-amido-2'-methylbenzene. | do | Do. |
| Do | Benzidine - 2.2' - disulfo-5.5'-dicarboxylic acid | 2.3 - hydroxynaphthoyl - 1'-amido-2'-ethoxybenzene. | Isobutylamine | Scarlet. |
| Do | 4-toluidine-2-sulfonic acid | 2.3 - hydroxynaphthoyl - 1'-amido-2'-ethoxybenzene. | Isopropylamine | Do. |
| 4-chloro-2-anisidine | 4-sulfo-2-amino-benzoic acid | 2.3 - hydroxycarbazoyl - 1' - amido - 4'-chlorobenzene. | Diethylamine | Brown. |
| 2-amino-5-benzoyl-amino-hydroquinone-diethylether. | Tetrahydro-quinoline-monosulfonic acid. | 2.3 - hydroxynaphthoyl-1'-amido-benzene. | Propylamine | Blue. |
| 2-amino-5-benzoyl-amino-hydroquinone-dimethylether. | Pyrollidine-α-sulfonic acid | 2.3 - hydroxynaphthoyl - 1'-amido-2'-methylbenzene. | Diethylamine | Do. |
| 2-amino-5-benzoyl-amino-hydroquinone-diethylether. | Ethylene-diamine-diacetic acid | 2.3-hydro-naphthoyl-1'-amino-benzene | do | Do. |
| 2-amino-5-benzoylamino-hydroquinone-dimethylether. | α-pyridyl-amino-acetic acid | 2.3 - hydroxynaphthoyl - 1'-amido-benzene. | do | Do. |
| 2-amino - 5 - benzoyl - amino - 4-methyl-anisol. | Pyrollidine-β-carboxylic acid | 2.3-hydroxy-naphthoyl-1'-amidobenzene. | do | Violet. |
| 4-chloro-2-toluidine | Aniline-2.5-disulfonic acid | Diacetoacetyl-o-toluididide | n-butylamine | Yellow. |

I claim:—

1. In the process of preparing azo dyestuffs from coupling components and such diazoamino compounds as contain acid solubilizing groups in the radical attached to the amino nitrogen and can be split off into the diazo compound and the amine by a reduction in the alkalinity of the preparation, the modification which comprises employing the diazoamino compounds at least partly in the form of salts with volatile bases, and developing the dyestuff by eliminating said volatile bases from such compositions by heating in the presence of moisture, whereby the acid groups set free by such elimination decompose said diazoamino compounds with the formation of the corresponding diazo compound and coupling of the diazo compound and the coupling component takes place.

2. The process as claimed in claim 1 wherein the preparation of the azo dyestuffs is effected on the fiber, the heat treatment necessary for developing the dyestuff being effected by steaming.

3. The process as claimed in claim 1 wherein the major portion of said diazo amino compounds is present in the form of salts of said diazo amino compounds with volatile bases and the major portion of the bases employed for dissolving said coupling components consists of volatile bases.

4. The process as claimed in claim 1 in which all of said diazo amino compounds are present in the form of salts of such diazo amino compounds with volatile bases and the bases employed for dissolving said coupling components consist of volatile bases.

5. The process as defined in claim 1 in which non-volatile alkali is present in the composition in an amount which is substantially less than that required to neutralize the acid groups contained in the diazoamino compound and in the coupling component.

6. In the process of preparing azo dyestuffs from coupling components and such diazoamino compounds as contain acid solubilizing groups in the radical attached to the amino nitrogen and can be split off into the diazo compound and the amine by a reduction in the alkalinity of the preparation, the modification which comprises employing the diazoamino compound at least partly in the form of salts with volatile bases, providing the major part of the alkalinity necessary for solubilizing the coupling component in the form of volatile bases and developing the dyestuffs by eliminating said volatile bases from such composition by heating in the presence of moisture whereby the acid groups set free by such elimination decompose said diazoamino compounds with the formation of the corresponding diazo compounds and coupling of the diazo compound and the coupling component takes place.

7. The diazo dyestuff compositions comprising azo dyestuff coupling components and volatile base salts of diazoamino compounds which contain acid salt forming solubilizing groups in the radicals attached to the amino nitrogen and can be split off into the diazo compounds and the amines by a reduction in the alkalinity of the preparation.

8. The preparations as claimed in claim 7 wherein lower alkylamines are employed as volatile bases.

9. The preparations as claimed in claim 7 wherein lower alkylamines of a boiling point between about 30° C. and about 80° C. are employed.

10. The preparations as claimed in claim 7 wherein non-volatile alkali is present in the composition in an amount which is substantially less than that required to neutralize the acid groups contained in the diazoamino compound and in the coupling component.

ALBERT SCHMELZER.